United States Patent [19]

Wentzell

[11] 4,436,190

[45] Mar. 13, 1984

[54] TORSIONLESS MULTIPLE CONNECTOR REEL DEVICE

[75] Inventor: Timothy H. Wentzell, South Windsor, Conn.

[73] Assignee: Combustion Engineering, Inc., Windsor, Conn.

[21] Appl. No.: 287,679

[22] Filed: Jul. 29, 1981

[51] Int. Cl.³ .......................................... H02G 11/00
[52] U.S. Cl. .............................................. 191/12.2 R
[58] Field of Search ...................... 191/12.2 R, 12.2 A, 191/12.4

[56] References Cited

U.S. PATENT DOCUMENTS

| | | | |
|---|---|---|---|
| 2,450,257 | 9/1948 | Simmons | 191/12.2 R |
| 2,751,565 | 6/1956 | Johnston | 191/12.2 R X |
| 2,876,045 | 4/1975 | Knarreborg | 191/12.2 R |
| 2,972,667 | 2/1961 | Ryder | 191/12.2 R X |
| 3,854,017 | 12/1974 | Crim | 191/12.2 R |
| 3,876,045 | 4/1975 | Knarreborg | 191/12.2 R |

Primary Examiner—Richard A. Schacher
Attorney, Agent, or Firm—L. James Ristas

[57] ABSTRACT

A drum-type apparatus for feeding and retrieving electrical signal cable, having an intermediary reel and cable arrangement for preventing torsional cable stresses anywhere between the drum and the output circuitry. The reel is coaxially mounted with the drum, and rotates simultaneously therewith. A ribbon cable is coiled in layers around the reel, and has one end connected to the tail end of the signal cable such that the connection rotates in unison with the drum and reel. Preferably, a housing is provided around the reel to maintain the concentricity of the ribbon cable layers. As the drum rotates, the average effective diameter of the ribbon cable coil changes without causing torsional stresses.

3 Claims, 5 Drawing Figures

TORSIONLESS MULTIPLE CONNECTOR REEL DEVICE

BACKGROUND OF THE INVENTION

This invention relates to the manipulation of electrical cable, and more particularly to the winding and unwinding of highly sensitive instrumentation cable by a drum or reel.

In a variety of fields of use, high quality electrical cables carry information which must not be measurably degraded by the cable itself. For example, in connection with the inspection of manufactured components or operating equipment, where stains gages, eddy current, or ultrasonic probes are often used, and in sound reproduction systems, the signal characteristic must be preserved. This poses a problem when the signal source is remote from and moveable relative to, the signal processing equipment. The feeding out and retrieval of the cable during signal transmission must not introduce high frequency noise, which can spoil the signal.

As a more specific example, in connection with the inspection of tubes in the steam generators of nuclear power plants, the inspection probe must be remotely driven up into each tube at a controlled rate of advance, and the probe position at any moment must be known exactly, so that the ultrasonic output signal can be correlated with a unique location in the tube. This is often accomplished using a precisely grooved and dimensioned drum to withdraw or advance the cable.

One major problem associated with drum drives is the deleterious effect on the cable of the torsion resulting from the rotation of the drum. Typically, one end of the cable is connected to a fixed member, such as plug or socket. Because of the high frequency noise they generate, slip rings between the cable and drum cannot be used. As a result, continual torsional stresses cause rapid degradation of the cable used in such inspections, necessitating a frequent replacement. Since steam generator inspection is often on the critical path of work to be done during nuclear power plant outages, a significant benefit can be achieved by providing a torsionless cable connection for the drum.

SUMMARY OF THE INVENTION

The present invention provides a device for connecting the tail end of an electrical input signal cable to a stationary output circuit, so that the input cable can be advanced and retrieved on a drum without undergoing torsional stresses. This is accomplished by an intermediary reel arrangement between the drum and the stationary output circuit, that reproduces the rotational motion of the drum but acts upon a flexible intermediary cable, preferably of the ribbon type.

This intermediary cable is coiled within a reel housing to expand or contract in effective average coil diameter, as the drum rotates to advance or retract the input cable. The connection between the tail of the input cable on the drum, and the innermost or lead end of the intermediary cable, is arranged to move simultaneously with the drum rotation so no torsion is produced therebetween. As the effective average coil diameter of the intermediate cable expands or contracts, only tensile or compressive forces are generated. With a ribbon cable, such forces readily produce a layered coil that is compact and easily managed.

The invention includes a stationary frame and a drum carried by the frame and adapted to store, advance, and retrieve the input cable by rotating about an axis. A reel is carried by the frame adjacent to and coaxial with the drum. An intermediate cable, preferably a ribbon cable, is coiled or circumferentially wrapped about the reel. The intermediary cable has its inner end adapted to connect to the trail end of the input cable and to rotate with the reel, as the reel and drum rotate simultaneously about the axis. Preferably, a stationary housing encloses the reel and intermediary cable for maintaining the intermediary cable in a substantially concentric, coiled condition. Also, plug or socket means may be carried by the housing for joining the tail, or outermost, end of the ribbon cable to the output cable leading to the stationary output circuit.

THE DESCRIPTION OF THE PREFERRED EMBODIMENT

Figure 1:
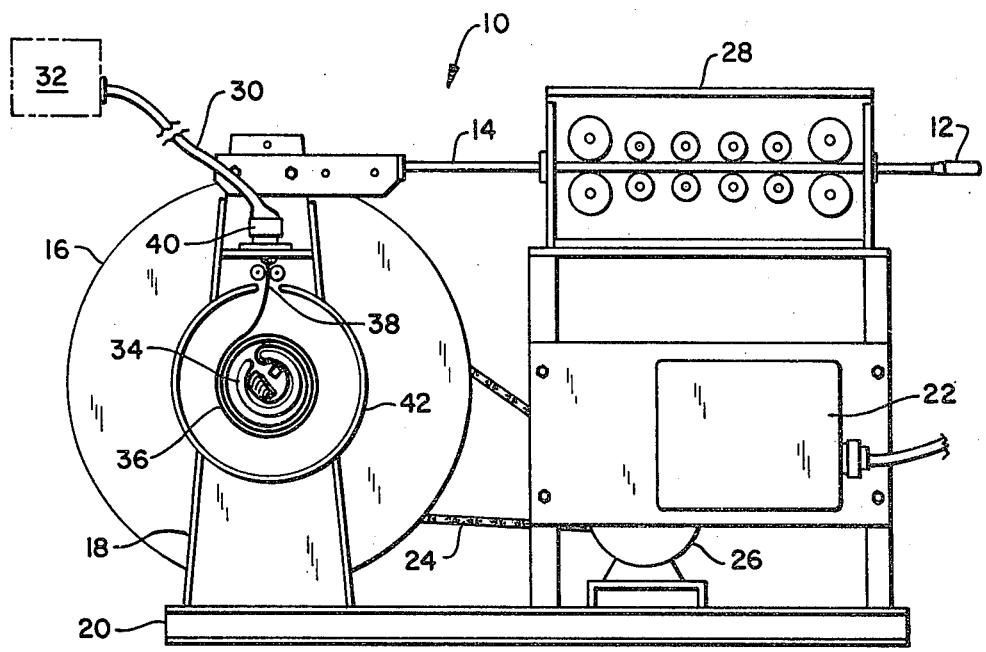
FIG. 1 is a schematic view of one embodiment of the invention showing a drum-type apparatus for storing, advancing, and retrieving an electrical cable having an ultrasonic probe on its leading end.

FIG. 1 is a schematic view of one embodiment of the invention, showing a drum-type apparatus 10 for storing, advancing, and retrieving an electrical cable having an ultrasonic probe on its lead end. The probe 12 is securely attached to the end of the probe or input signal cable 14, which is circumferentially wrapped along grooved helical surfaces (not shown) in the take up drum 16. The drum 16 is supported by and rotates within a drum mount or frame 18 which is an extension of the apparatus stand 20. In the illustrated embodiment, the stand 20 also has mounted thereon a power source 22 for operating the chain drive 24 and gears 26 which rotate the drum, and a probe drive 28 which advances the cable 14 and probe 12 into the steam generator tube (not shown). Such drum and probe drive arrangement has been in use for steam generator inspections and operates satisfactorily for performing an inspection of short duration.

A persistant problem, however, has been the short life of the output line or cable 30 which connects the probe or signal cable 14 to the stationary output circuit 32. Before the present invention, the rotation of the drum 16 while advancing and retracting the probe cable 14 would produce torsional stresses on the electrical cable 30 running from the drum to the stationary output circuit. Constant stressing of this type would soon cause deterioration of the cable running to the stationary output circuit.

According to the present invention, an intermediary reel and cable is provided for accommodating the rotational motion of the drum without producing the torsional stresses that limit the lifetime of the stationary or output cable 30. The invention provides a reel 34 that is carried by the frame or drum mount 18 adjacent to and coaxial with the drum 16. The intermediate cable 36, preferably a ribbon cable, has its lead or innermost end connected to the tail end of the signal cable 14. The outermost or tail end 38 of the ribbon cable is wired to the output socket 40 which in turn is adapted to be connected to the stationary output cable 30. The connection between the lead end of the ribbon cable 36 and the signal cable 14 is conveniently made within the cylindrical drum 16. The drum and reel are on a common, hollow axle through which the lead end of the ribbon cable may enter the space within the cylindrical drum and be connected to the tail end of the signal cable. The ribbon cable is coiled or wound about the cylindrical reel 34 in a relatively tight coil when the probe and probe cable are in the fully would condition as shown in FIG. 1.

When the probe 12 is advanced and the drum 16 rotates clockwise, the reel 34 rotates clockwise simultaneously with the drum, thereby loosening the coil of the ribbon and increasing the average effective diameter of the coil. It may be appreciated that as the reel rotates clockwise, the only forces on the ribbon cable 36 are compressive and have the effect of loosening the coil. Although not preferred, other intermediary cable types could also be used provided that they were flexible enough to readily expand or contact in effective coil diameter.

Figure 3:
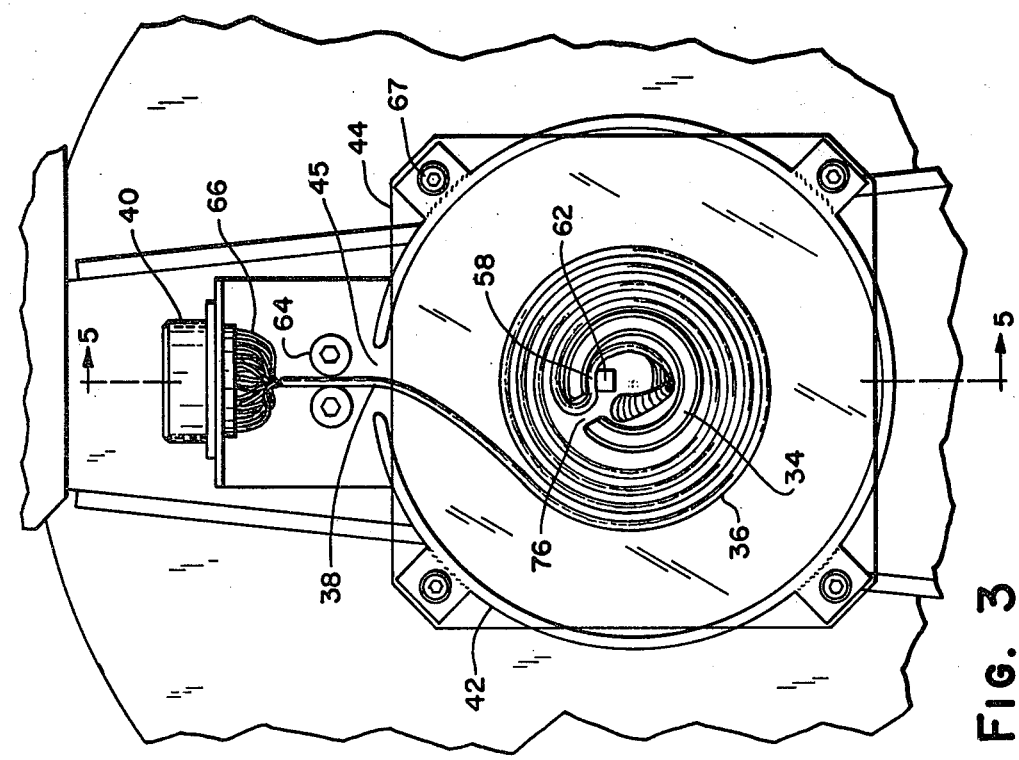
FIG. 3 is a detailed view of the torsionless reel of FIG. 1, in the fully coiled condition corresponding to the probe being fully retracted and probe cable being fully wound on the take up drum.

In order to avoid entanglement of the intermediary cable 36, the reel 34 is surrounded by a generally cylindrical reel housing 42 for enclosing the ribbon cable windings and maintaining them in a substantially concentric configuration. Preferably, as shown in FIG. 3, the housing includes a detachable cover 44 made of plexiglass so that the coiling of the ribbon cable 36 may be readily observed during operation. As will be more fully described below, the key feature of the invention is the arrangement whereby the reel 34, drum 16, and connection between the ribbon cable 36 and the tail of the probe cable 14, all rotate simultaneously and in unison.

Figure 2:
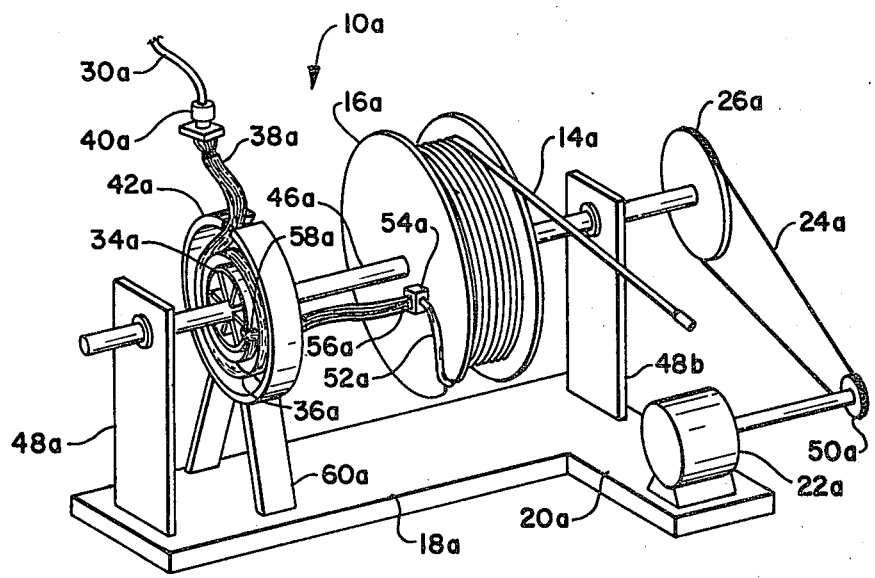
FIG. 2 is a schematic representation of the essential structure features of the invention, to illustrate their functional relationships.

FIG. 2 is a simplified representation of the apparatus 10a shown in FIG. 1, wherein the rotating axis 46a is elongated and the relationship of the reel 34a and drum 16a is somewhat exaggerated to illustrate their functions. The frame 20a carries the drum mount 18a which includes separated drum stand 48a, 48b supporting the rotating axis. The axis is rotated by an idler gear 26a at one end connected by a chain 24a to the drive gear 50a which in turn is rotated by the power source 22a. The drum 16a and reel 34a are connected to the rotating axis 46a and rotate therewith in simultaneous unison.

The probe cable 14a is wrapped around the drum 16a and the tail end 52a thereof is shown clamped at 54a to the side wall of the drum. The lead end 56a of the ribbon cable 36a is connected to the tail end 54a of the probe cable and is also pinched or clamped to the reel at 58a in any convenient manner which permits the ribbon cable to coil about the perimeter of the reel 34a. In FIG. 2, the ribbon cable is shown in an uncoiled or loosely coiled condition for the sake of clarity. The tail end 38a of the ribbon cable is stationary and adapted to engage the stationary output circuit cable 30a.

The drum mount 18a also has projecting therefrom a reel housing stand 60a for supporting the reel housing 42a, which maintains a stationary position as the reel rotates within it. It may be appreciated that as the drum 16a and reel 34a rotate, the clock position of the torsionless connection 54a between the probe cable 52a and the ribbon cable 56a remains the same as the position of the clamp 58a of the ribbon cable in the reel. Thus, no torsional stresses are applied. The only forces acting on the ribbon cable 34a from its clamped location 58 on the reel 34a to the output socket 40a are compression or tension forces that merely tend to increase or decrease the effective average radius of the coil.

FIG. 3 is a view of the torsionless reel 34 of FIG. 1 in the fully coiled condition corresponding to the probe being fully retracted and the cable being fully wound on the drum 16. The ribbon cable 36 is clamped to the reel at 58 by means of a pinch bar 62 which is adjustably mounted, as by screws, to the reel 34. The ribbon cable, which may typically be up to 45 feet in length, is wound about the reel and emerges through an opening 45 in the reel housing 42, then is secured by ribbon grips 64 to prevent stresses on the delicate wire connections 66 to the socket 40. Preferably, the housing cover 44 is readily detachable from the remainder of the housing as by cover screws 67.

Figure 4:
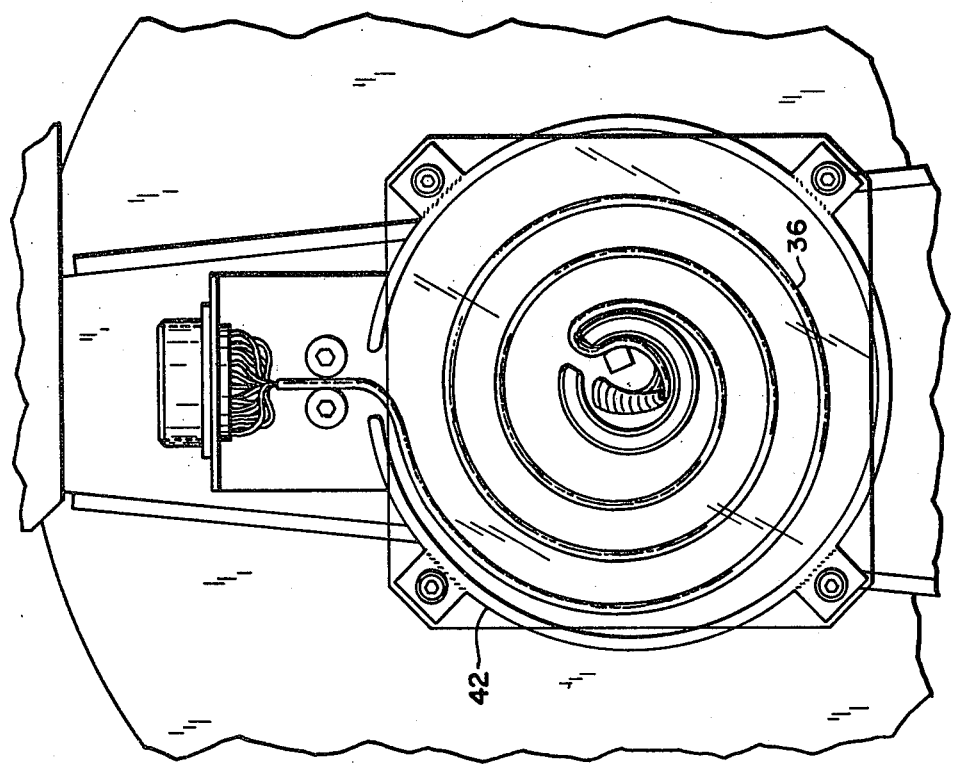
FIG. 4 is a detailed view of the torsionless reel of FIG. 1, in the uncoiled condition, corresponding to full advancement of the probe.

FIG. 4 is a detailed view of the torsionless reel of FIG. 1 in the uncoiled condition, corresponding to the full advancement of the probe. In this figure, it may be seen that the average effective coil diameter is considerably larger and the coil is looser than illustrated in FIG. 3. It may also be appreciated that the housing 42, or other equivalent means such as large flanges on the reel, should be provided to assure that the loose ribbon cable 36 remains in a substantially concentric configuration. For purposes of this disclosure, concentric is intended to mean radially layered rather than requiring precise coincidence of the center of each layer of the coil.

Figure 5:
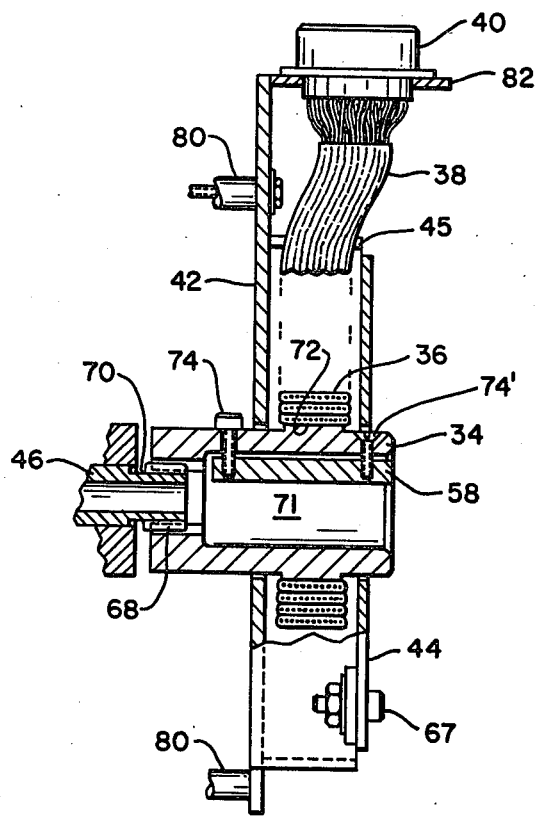
FIG. 5 is a section view along the lines 5—5 of FIG. 3, showing the preferred embodiment of the invention.

FIG. 5 is a section view along the lines 5—5 of FIG. 3, showing the preferred embodiment in greater detail. The cylindrical reel 34 is effectively a hollow hub which has splines 68 that slide into a hollow post 70 which in turn is connected to the axle 46 of the drum (See FIG. 2). The reel 34 preferably has a slightly raised, circumferential track 72 on which the ribbon cable 36 may be coiled. As described previously, the ribbon cable 36 is preferably connected to the tail of the probe cable within the cylindrical drum. The ribbon cable traverses the drum axle 46, through the post 70 and into the hollow portion 71 of the reel 34. The ribbon cable then bends around the pinch bar 58 which is adjustably tightened by screws 74, 74' to clamp the ribbon against the reel. As shown in FIGS. 3 and 4, the reel has a slot 76 therein so that the ribbon cable may pass through the reel into the track 72, whereupon it may be coiled. The opening 45 in the housing 42 permits the tail end 38 of the ribbon cable to be connected to the output socket 40. In FIG. 5, a portion of the ribbon cable from the coil to the socket has been deleted for clarity.

It may also be seen in FIG. 5 that the reel housing 42 is detached from the reel 34, and stationary relative thereto. In the illustrated embodiment, the reel housing is bolted at 80 to the drum mount 18. The socket base plate 82 is an extension of the housing.

The illustrated embodiment is used in connection with inspection equipment wherein the probe is advanced along a tube length. The invention may readily be adapted for use in other inspection techniques such as eddy current or strain gage transducers. Furthermore, the invention may be used in sound amplification systems when, for example, a microphone must be moved. The common characteristic of conditions for which the invention is most suited are that the signal cable is to be moved or translated by a rotating drum or equivalent structure, especially where the cables and associated equipment are confined to a relatively small area and loose cables on the floor are not desirable. Furthermore, the advancing and retraction of the signal cable is continual such that torsional stresses on the cable or signal transmitting wires would unduly limit the useful lifetime of the equipment. Also, where the inspections or other signal generating must be done remotely, as in a radiation or other hazardous environment, the invention provides a simple and effective way of handling cables.

I claim:

1. An apparatus to be electrically connected to a stationary output circuit, for advancing and retrieving an electrical input cable, comprising:
    a stationary frame;
    a drum carried by the frame and adapted to advance and retrieve the input cable by rotating about an axis;
    a reel carried by the frame adjacent to and coaxial with said drum;
    a flexible ribbon cable circumferentially coiled about said reel, the ribbon cable having its inner end adapted to connect to the tail end of the input cable and to rotate with the reel about said axis;
    a housing enclosing the ribbon cable for maintaining the ribbon cable substantially concentric;
    socket means carried by the frame and wired to the tail end of the ribbon cable, adapted to electrically connect the ribbon cable to the output circuit; and
    means for rotating the drum and reel simultaneously.

2. The apparatus of claim 1 wherein said drum includes an axle and said reel includes a hub connected to said axle for rotation therewith.

3. The apparatus of claim 2 wherein said housing is supported by said frame and includes a generally cylindrical portion detached from and coaxially surrounding said hub.

* * * * *